US012791348B2

(12) United States Patent
Suplin et al.

(10) Patent No.: US 12,791,348 B2
(45) Date of Patent: Nov. 10, 2026

(54) AUTOMATED LOW VELOCITY VEHICLE PATH PLANNING

(71) Applicant: GM Global Technology Operations LLC, Detroit, MI (US)

(72) Inventors: Vladimir Suplin, Modin (IL); Aviran Sadon, Kiryat Ono (IL); Ohad Ross, Rosh Haayin (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 135 days.

(21) Appl. No.: 18/735,692

(22) Filed: Jun. 6, 2024

(65) Prior Publication Data

US 2025/0377214 A1 Dec. 11, 2025

(51) Int. Cl.

*G01C 21/36* (2006.01)
*G06N 3/092* (2023.01)
*B60W 30/06* (2006.01)

(52) U.S. Cl.

CPC ......... *G01C 21/3685* (2013.01); *G06N 3/092* (2023.01); *B60W 30/06* (2013.01)

(58) Field of Classification Search

CPC ...... G01C 21/3685; G06N 3/08; G06N 3/092; B60W 30/06
USPC ........................................................ 701/25
See application file for complete search history.

(56) References Cited

U.S. PATENT DOCUMENTS

| | | | |
|---|---|---|---|
| 10,363,960 B2 | 7/2019 | Stefan et al. | |
| 2020/0363813 A1* | 11/2020 | He | G06N 3/088 |
| 2024/0317214 A1* | 9/2024 | Sugiarto | B60W 30/06 |

FOREIGN PATENT DOCUMENTS

| | | | | |
|---|---|---|---|---|
| CN | 115384483 A * | 11/2022 | B60W 30/06 |
| CN | 117382616 A * | 1/2024 | B60W 30/06 |
| CN | 117433797 A * | 1/2024 | G06T 11/23 |
| DE | 102016220945 A1 | 5/2017 | |
| DE | 102017126539 A1 | 5/2019 | |
| DE | 102019115712 A1 | 12/2020 | |
| DE | 102020205072 A1 | 10/2021 | |
| DE | 102022207957 B3 | 12/2023 | |

OTHER PUBLICATIONS

German Application No. 10 2024 121 744.8 filed Jul. 31, 2024; German Office Action dated Jan. 10, 2025; 5 pages.

* cited by examiner

*Primary Examiner* — Ernesto A Suarez
(74) *Attorney, Agent, or Firm* — CANTOR COLBURN LLP

(57) ABSTRACT

A method for planning a vehicle path includes generating an initial perception data set using one or more vehicle sensors. The data set includes data defining spatial positions of features extrinsic to the vehicle. The method determines an operational area of the parking operation, at least one goal pose of the vehicle, and a set of constraints. The method iteratively generates path segments using a reinforcement learning algorithm. Each completed set of path segments is configured to reposition the vehicle from the initial pose to one of the goal poses. Iteratively generating the sets of path segments includes determining a total path score for each generated set of path segments. The method selects a set of path that has a best total path score, generates a set of path points and provides the set of path points to an automated parking controller operation.

20 Claims, 4 Drawing Sheets

AUTOMATED LOW VELOCITY VEHICLE PATH PLANNING

INTRODUCTION

The subject disclosure relates to vehicles, and in particular to driver assist systems configured to plan and implement low velocity vehicle travel paths.

Modern vehicles include increasingly more accurate perception systems that allow the vehicles to generate accurate knowledge of the current surrounding environments using cameras, ranging systems, vehicle connectivity systems, geospatial location systems, and the like.

The current surrounding environment of the vehicle allows automated vehicle systems and driver assistance systems to either take over control of the vehicle during complex maneuvers or to assist the vehicle during such maneuvers. Path planning algorithms and methodologies require large amounts of computational resources in the form of both energy and processing cycles. In addition, some paths that may move the vehicle to an acceptable or desired position may utilize sharp turns, starts and stops, and similar maneuvers that are jarring or otherwise uncomfortable for vehicle passengers and eliminating such paths further increases the computational load.

Vehicle control systems have limited on-board processing power and available energy. Generating acceptable paths within a required timeframe is difficult using current technology. Accordingly, it is desirable to provide a path planning method that generates an acceptable path within a limited timeframe and without exceeding the computational budget of a vehicle controller.

SUMMARY

In one exemplary embodiment a method for planning a vehicle path includes generating an initial perception data set using one or more vehicle sensors. The initial perception data set includes data defining spatial positions of features extrinsic to the vehicle relative to a vehicle. The method determines an operational area of a parking operation based on the generated initial perception data set and identifies an initial pose of the vehicle, at least one goal pose of the vehicle, and a set of constraints using the initial perception data and the operational area. The method iteratively generates sets of path segments using a reinforcement learning algorithm. Each completed set of path segments is configured to reposition the vehicle from the initial pose to one of the at least one goal pose. Iteratively generating the sets of path segments includes determining a total path score for each generated set of path segments. The method selects a set of path segments in the iteratively generated sets of path segments that has a best total path score, generates a set of path points using the path segments and provides the set of path points to an automated parking controller operation within the vehicle.

In addition to one or more of the features described herein the automated parking controller operation causes the vehicle to move along the set of path points from the initial pose to a position within a predefined range of the one of the at least one goal poses.

In addition to one or more of the features described herein, the method includes replanning the parking operation as the vehicle moves along the set of path points in response to a new perception data set where the new perception data set varies from the initial perception data set.

In addition to one or more of the features described herein at least a portion of the completed set of path segments are defined by a sequentially ordered combination of simple actions and complex actions.

In addition to one or more of the features described herein each simple action outputs one of an arc and a straight line, wherein the arc is defined by an arc radius and an arc length.

In addition to one or more of the features described herein each complex action defines a specific vehicle maneuver and comprises a stored algorithm configured to output a predefined set of path primitives ordered to achieve the specific vehicle maneuver.

In addition to one or more of the features described herein iteratively generating sets of path segments using a reinforcement learning algorithm includes selecting a path primitive and estimating an estimated score reward corresponding to the path primitive using an estimation algorithm, responding to the estimated score reward exceeding a predetermined amount by simulating operation of the path primitive in a real world model and determining a simulated reward based on an output of the simulation, and placing the selected path primitive as a next path primitive in the set of path primitives and adding the simulated reward to a total reward of the set of path primitives.

In addition to one or more of the features described herein the estimation algorithm is an output of a neural network and wherein the estimated score reward, simulated score reward, selected path primitive and the set of constraints are added to an updated training data set of the neural network.

In addition to one or more of the features described herein, the method further includes retraining the neural network and updating the estimation algorithm using the updated training data set and replacing the estimation algorithm with an updated estimation algorithm determined using the retrained neural network.

In addition to one or more of the features described herein the at least one goal pose comprises a set of goal poses included a finished parking position pose and at least one close pose, wherein the close pose is a pose from which the vehicle is able to be maneuvered to the finished parking position using at most three total combined simple actions and complex actions.

In another exemplary embodiment a vehicle includes a perception system including a ranging sensor, the perception system being in communication with a vehicle controller. The vehicle controller has a memory and a processor, and includes an automated parking module configured to perform a parking operation. The parking operation includes generating an initial perception data set using one or more vehicle sensors, wherein the initial perception data set includes data defining spatial positions of features extrinsic to the vehicle relative to the vehicle, determining an operational area of the parking operation based on the generated initial perception data set, identifying an initial pose of the vehicle, at least one goal pose of the vehicle, and a set of constraints using the perception data and the operational area, iteratively generating sets of path segments using a reinforcement learning algorithm, wherein each completed set of path segments is configured to reposition the vehicle from the initial pose to one of the at least one goal pose, and wherein iteratively generating the sets of path segments includes determining a total path score for each generated set of path segments, selecting a set of path segments in the iteratively generated sets of path segments having a best total path score, generating a set of path points using the path segments, and providing the set of path points to an automated parking controller operation within the vehicle.

In addition to one or more of the features described herein the automated parking controller operation causes the vehicle to move along the set of path points from the initial pose to the one of the at least one goal poses.

In addition to one or more of the features described herein further includes replanning the parking operation as the vehicle moves along the set of path points in response to a new perception data set where the new perception data set varies from the initial perception data set.

In addition to one or more of the features described herein at least a portion of the completed set of path segments are defined by a sequentially ordered combination of path primitives.

In addition to one or more of the features described herein each path primitive is one of an arc and a line, wherein the arc is defined by a radius and an arc length.

In addition to one or more of the features described herein a subset of the sequentially ordered combination of path primitives is an output of a complex action, and the subset of sequentially ordered combination of path primitives is configured to achieve a known vehicle maneuver.

In addition to one or more of the features described herein iteratively generating sets of path segments using a reinforcement learning algorithm includes selecting a path primitive and estimating an estimated score reward corresponding to the path primitive using an estimation algorithm, responding to the estimated score reward exceeding a predetermined amount by simulating operation of the path primitive in a real world model and determining a simulated reward based on an output of the simulation, and placing the selected path primitive as a next path primitive in the set of path primitives and adding the simulated reward to a total reward of the set of path primitives.

In addition to one or more of the features described herein the estimation algorithm is an output of a neural network and wherein the estimated score reward, simulated score reward, selected path primitive and the set of constraints are added to an updated training data set of the neural network.

In addition to one or more of the features described herein further includes retraining the neural network and updating the estimation algorithm using the updated training data set and replacing the estimation algorithm with an updated estimation algorithm determined using the neural network.

In addition to one or more of the features described herein the at least one goal pose comprises a set of goal poses included a finished parking position pose and at least one close pose, wherein the close pose is a pose from which the vehicle is able to be maneuvered to a finished parking position using at most three total combined simple actions and complex actions.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
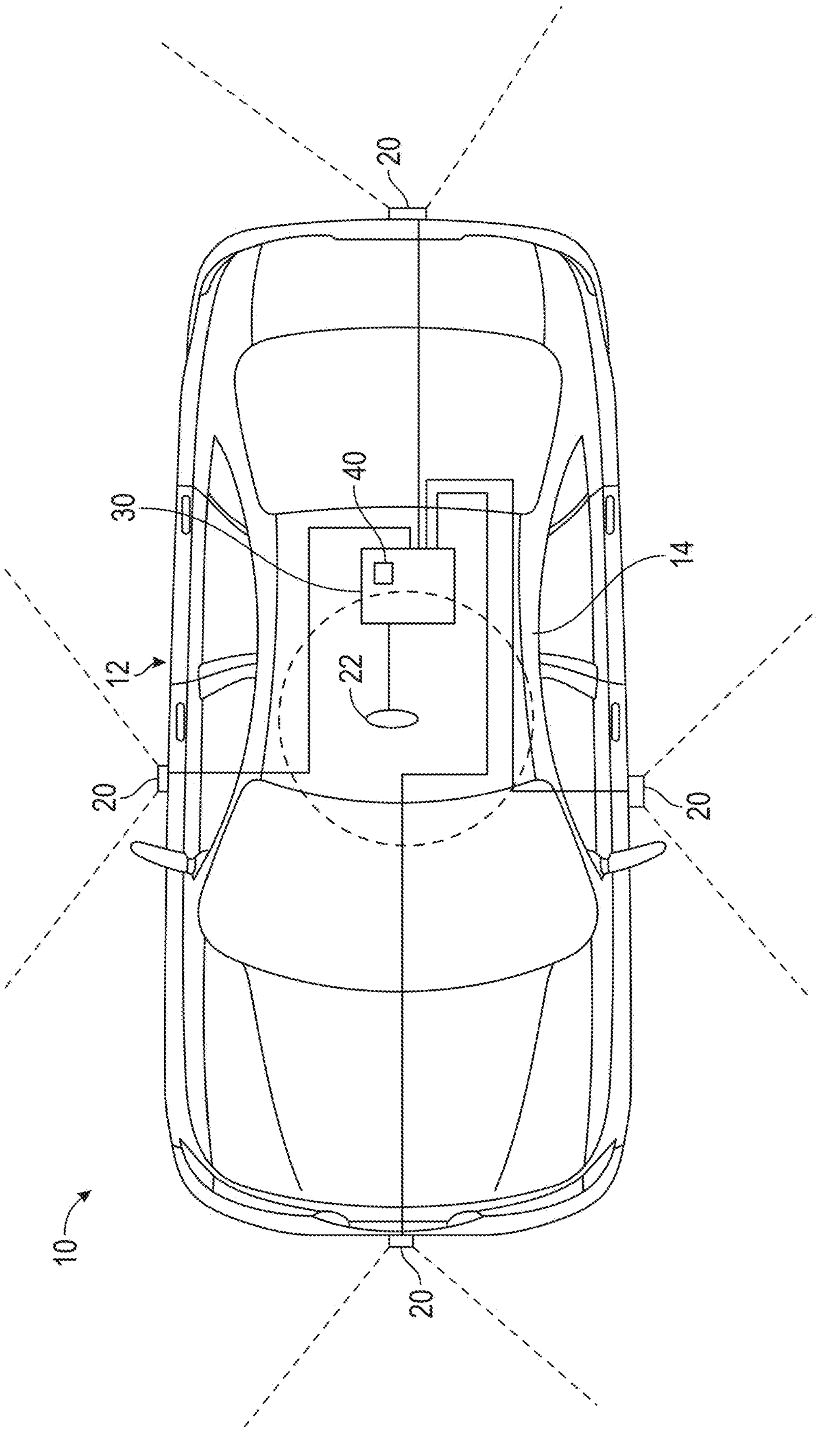
FIG. 1 is an illustration of a vehicle including a path planning system.

The following description is merely exemplary in nature and is not intended to limit the present disclosure, its application or uses. It should be understood that throughout the drawings, corresponding reference numerals indicate like or corresponding parts and features.

As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

As used herein, the term pose refers to a combined position and orientation of an object (such as a vehicle) in the real world.

As used herein, the term extrinsic features refers to stationary and mobile objects within a surrounding environment of a vehicle or similar object (referred to generally as a vehicle). Extrinsic features are independent from the vehicle and the positioning of extrinsic objects may be fixed, variable, or in motion regardless of the motion of the vehicle.

As used herein, the term operational area refers to a real world area in which a vehicle is authorized to operate. The bounds of an operational area may, in one example, be defined within a locally stored controller memory, controller firmware, via communications with a remote server. The bounds of an operational area may, in another example, be defined via detections within of an environmental perception system detecting extrinsic features such as buildings, other vehicles, curbs, road lines, and the like. In yet other examples, the operational area may be defined by control module rules, geofencing, or any combination of the above or similar systems for generating bounds.

As used herein a path primitive is a drivable path segment, such as a straight line, an arc, or a curve with the path segment being defined by a small number of variables (e.g. arc radius and arc length).

As used herein, a simple action is an action that produces a single path primitive to be added to the planned path.

As used herein, a complex action runs a predefined algorithm that outputs a set of path primitive designed to guide a vehicle toward the end goal.

Planning a path of motion (path planning) for moving a vehicle within a confined space remains one of the most challenging aspects of automated parking, and similar automated or semi-automated vehicle operations. Such operations must consider factors including (but not limited to) feasibility of the path, the presence of cusp points along the path, comfort of the passengers within the traveling vehicle, hardware limitations of the vehicle and the vehicle controller (s), and the real-time performance delays associated with determining the path.

In accordance with an exemplary embodiment methods, devices and systems are provided for achieving collision-free path planning of a vehicle within a confined space. A control module within a vehicle controller generates near-optimal nonholonomic paths for planning parking maneuvers, through the use of a path score estimator generated via a reinforcement learning approach. The same approach may be used for any similar movement operation (e.g., a vehicle low velocity maneuver) and such uses fall within the scope of this disclosure.

The path planning algorithm iteratively combines a limited set of path segments into a sequential path from an initial pose to a goal pose and uses the estimated path score to eliminate paths from consideration before a full simulation of the path is performed, thereby saving computational resources and improving response time.

The systems and processes described herein allow the vehicle to integrate data driven techniques and update the parking algorithm based on real application data. The disclosed systems and processes generate acceptable motion paths within a limited computational budget using the available hardware constraints and accounting for uncertainty of a physical environment that may arise due to low fidelity perception.

Embodiments described herein present numerous advantages and technical effects. Included among the advantages is a decreased computational load, memory size and reaction time due to the path score estimation.

The embodiments are not limited to use with any specific vehicle and may be applicable to various contexts. For example, the path planning algorithm may be utilized in any automated path planning including unmanned vehicles (e.g. wheeled robots) and/or any other mobile object.

FIG. 1 shows an embodiment of a motor vehicle 10, which includes a vehicle body 12 defining, at least in part, an occupant compartment 14. The vehicle body 12 also supports various vehicle subsystems including a propulsion system, a braking subsystem, a suspension system, a steering subsystem, a fuel injection subsystem, an exhaust subsystem and others.

The vehicle 10 includes a perception subsystem having a set of cameras 20 and at least one ranging device 22 (e.g., a light detection and ranging system and/or a radio detection and ranging system). In alternative examples, alternative forms of perception may be utilized in addition to, or instead of, the cameras 20. By way of example, a perception subsystem may be based on ultrasonic sensors or any similar sensor type. The particular locations and fields of view of the cameras 20 and the ranging device 22 are exemplary in nature and may be included at additional and/or alternate locations within a practical implementation of the vehicle 10. Alternative perception subsystems may utilize other forms of sensing and communication (e.g., vehicle to vehicle (V2V) or vehicle to other (V2X)) in addition to, or instead of, the illustrated components. The cameras 20 and the ranging device 22 are in communication with a controller 30. The controller 30 can be a dedicated controller, a general vehicle controller, a set of distributed controllers within the vehicle operating in coordination, or any similar control system. The perception system uses the cameras 20 and the ranging device 22 to generate data about external features within the environment surrounding the vehicle 10, and the relative positions of the external features to the vehicle 10. This data is generally referred to as "perception data".

Figure 2:
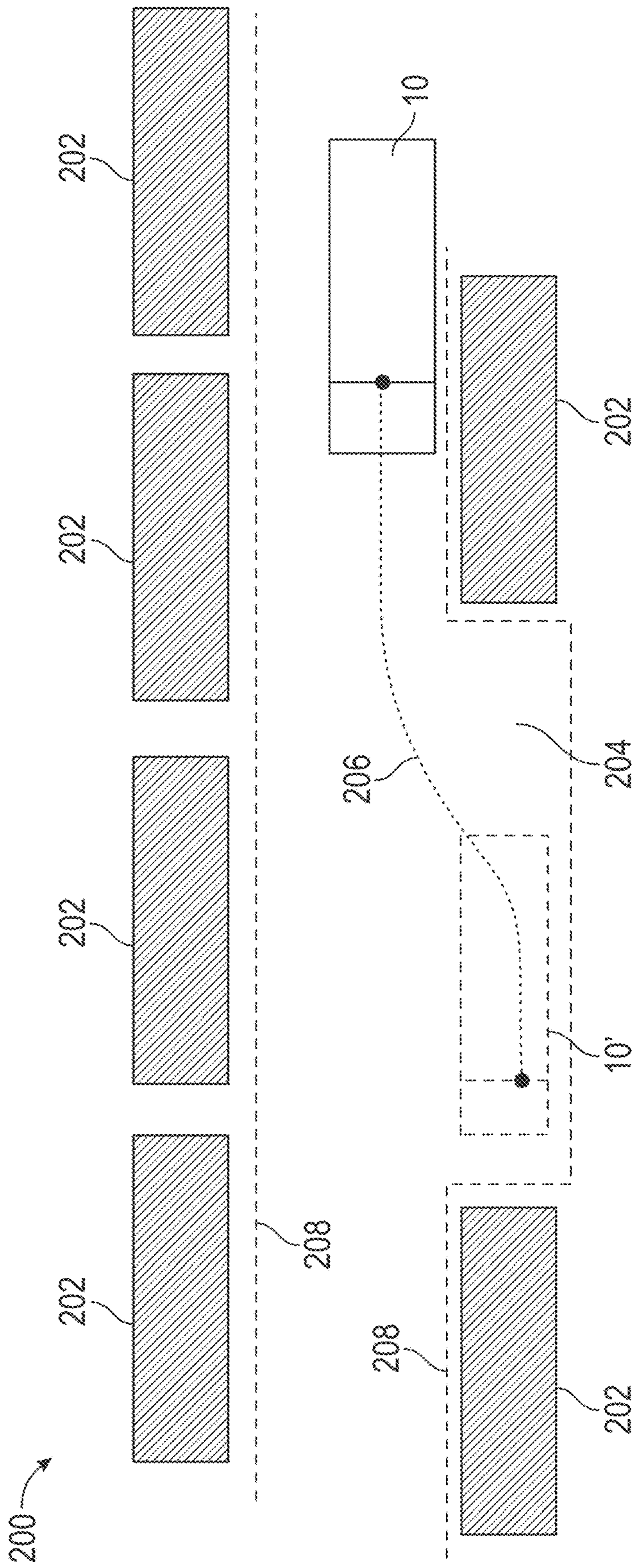
FIG. 2 is an example of a parking situation in which automated path planning is utilized.

The controller 30 includes an automated parking module 40. The automated parking module 40 receives the perception data and defines a parking path to move the vehicle 10 from its initial pose to a desired ending pose in which the vehicle 10 will be fully parked using a path determination process 300 (illustrated in FIG. 3). One example operation 200 is illustrated at FIG. 2, with continued reference to FIG. 1.

In the example operation 200 the vehicle 10 begins the operation at an initial location and detects external features 202 (currently parked vehicles). In addition to the external features 202 an available parking location 204 is located. In order to define the operational area of the parking maneuvers, constraints 208 are approximated from the perception data identifying the external features 202, and the automated parking module 40 (pictured in FIG. 1) determines an optimum parking path 206 along which the vehicle 10 should move to end with the vehicle 10' (the parked vehicle) in a finishing pose within the available parking spot 204. The constraints define an operational area that the vehicle 10 cannot leave during implementation of the parking path 206. The optimum parking path 206 allows the vehicle 10 to smoothly transition into the available parking spot 204 without violating the established constraints 208.

In some examples the constraints 208 are limited to external features that may cause a physical collision between a portion of the vehicle 10 and a portion of an external feature 202.

In other examples, the constraints 208 can include both external features 202 that may cause a collision, and external features (e.g. lane demarcations within a road) that cannot cause a collision but still define a boundary that the vehicle 10 should not intersect with.

Figure 3:
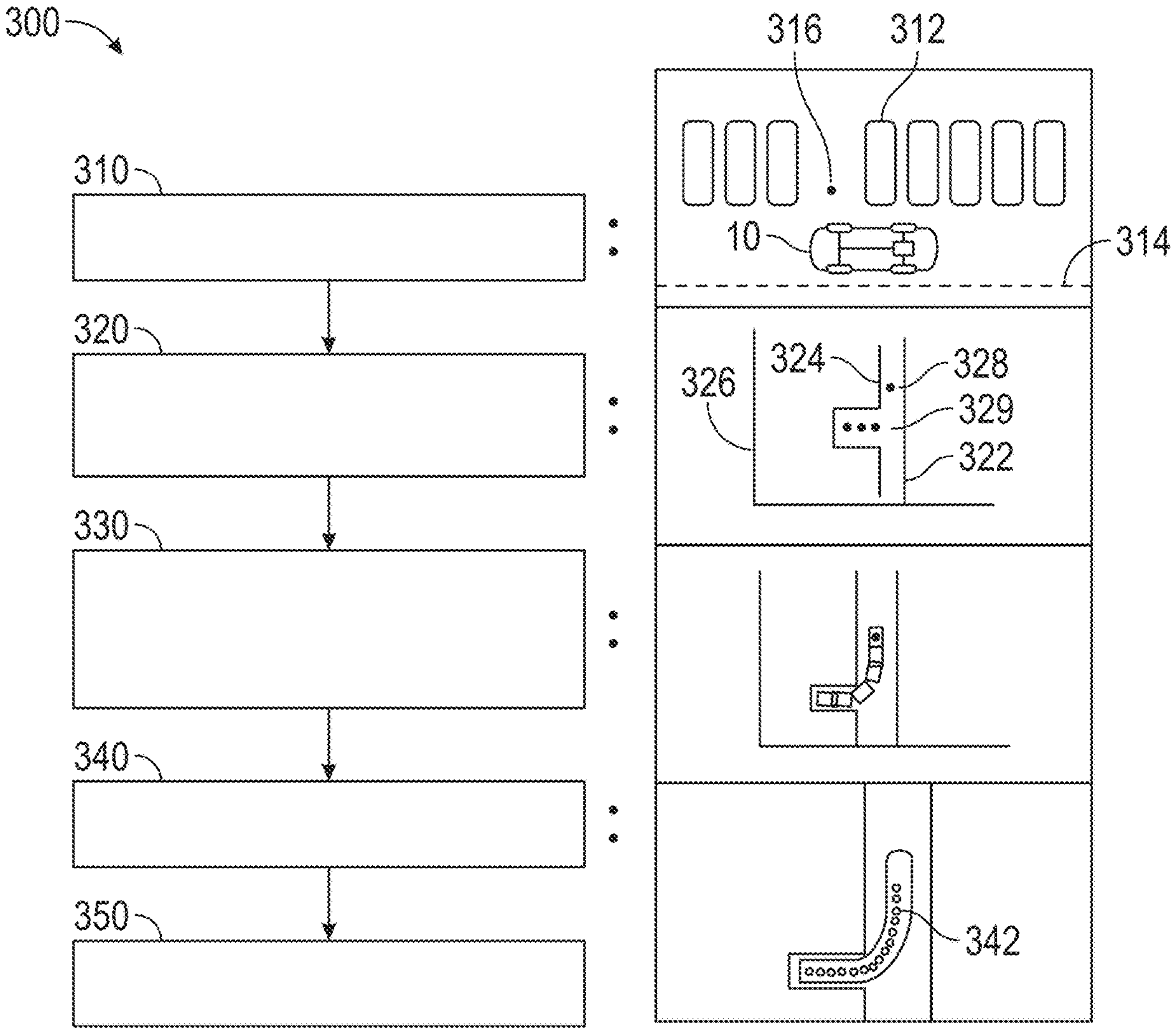
FIG. 3 is an illustrated process flow for planning an automated driving and/or assisted driving vehicle path.

With continued reference to FIGS. 1-2, FIG. 3 illustrates a flowchart demonstrating path determination process 300 in one implementation. In general operation the path determination process 300 iteratively analyzes each possible action (simple or complex) to generate a reward score corresponding to the possible action. An estimator is used to eliminate actions estimated to have below a certain score before a full simulation is completed, thereby saving computational resources and improving response time.

Initially, the path determination process 300 responds to a vehicle operator and/or vehicle control system requesting a parking operation, the automated parking module 40 collects perception data from the perception system in a "Collect Perception Data" step 310 (step 1). The perception data identifies multiple external features including parked vehicles 312 and a lane boundary 314. The pose of each external feature 312, 314 is further used to define an available parking spot 316.

Based on the perception data a set of constraints 322 (corresponding to the parked vehicles 312), 324 (corresponding to the lane boundary 314) are defined within a coordinate space 326 and an initial pose 328 and set of target goal poses 329 are defined in a Calculate Constraints and Initial Vehicle Pose and Goal Pose step 320 (step 2). The constraints represent an abstraction of the surrounding environment and define a drivable area. The drivable area allows to reduce the observation input into a neural network. The target goals 329 represent desired ending poses of the vehicle 10 that will either place the vehicle 10 in a parked pose or in a pose that renders the vehicle 10 able to be shifted to the parked pose with minimal simple path movements (e.g. moving straight for 6 inches).

The automated parking module 40 uses the constraints 322, 324, starting pose 328 and goal poses 329 to iteratively generate and score parking paths using a path estimation algorithm derived using reinforced learning in an Iteratively Generate Path Primitives Using Reinforcement Learning Algorithm step 330 (step 3).

The automated parking module 40 includes a number of stored simple actions and complex actions with undefined variables within a memory and the stored simple actions output just one path primitive and the stored complex actions run algorithms outputting a predefined set of path primitives. In alternative examples, the path primitives may be stored elsewhere in a shared memory accessible to the automated parking module 40. Each parking path is a sequential set of path primitives that, when operated in order, result in movement of the vehicle from the initial pose to a goal pose.

The estimator algorithm continuously estimates a path score at each iterative stage of the path generation, and paths with a score too low at estimation are discarded without further analysis. The total path score represents how optimum the path defined by the set of path primitives is. In the examples discussed herein, the best (most optimum) score is defined as the highest, with a score of 0 representing a failed path and/or a collision.

In one example the iterative path generation for each different path operates according to the following pseudo-code and utilizes an initial pose (Pi), parking constraints (Cs) and a goal pose (Pg) defined by the second step 320, a path score estimation function (Q), a maximum number of allowed path legs (L) with each path leg being a continued movement in one direction, a maximum number of path maneuvers (N) with each sequential path primitive being a maneuver.

The maximum number of maneuvers and the maximum number of legs allowed are set during manufacturing, depending on the total allowed processing power and computational cycles, and can be determined using ordinary procedures in the art.

Pseudo Code:

```
1.   nelg= 0, nman = 0,Score= 0. Path = {Pi}, Done=0, P = Pi
2.   whilenman< N
3.     S = {P, Cs}
4.     A =argmax(O(S, a))
5.     {Pnext, r, Collision} = transition(S, a)
6.     Score = Score + r
7.     Path = {Path, a, Pnext}
8.     nman=nman+1
9.     if dir_changedPath)
10.      nleg=nleg +1
11.    end
12.    if Collison == True
13.      break
14.    end
15.    if Pnext Pg
16.      Done = 1
17.      break
18.    end
19.    if nleg==L
20.      break
21.    end
22.    P=Pnext
23.  end
24.  return Path, Score, Done
```

At the beginning of the iterative process (line 1), each of the constraint values Nleg (the number of iterated legs), Nman (the number of iterated maneuvers) is set to 0, the total score (Score) of the path is set to 0, a path value (Path) representing a current pose of the vehicle 10 along the path is set to the initial pose Pi, a Done value representing completion of the path is set to 0, and a current pose P is set to the initial pose Pi.

Once the initial values are set, line 2 establishes that pseudo code loops as long as the total number of maneuvers is less than the maximum number of maneuvers constraint (N), with each path primitive used being a maneuver. The loop is contained within lines 3 through 22, and line 22 ends the loop once the number of maneuvers meets the maximum number of maneuvers N.

At line 3, the pseudo-code sets parameters of the current iterated system state S to the parking constraints (Cs) and the current pose of the vehicle (P).

At line 4, the pseudo-code uses an argmax function to find an action (a) that in the current state S has maximum estimated reward r=Q(S,a). When the determined reward (r) is too low, the process is ended and the path is determined to not be viable without performing a full simulation on the path.

At line 5, path primitives (a) from the selected action are modeled within an environment to simulate vehicle motion and the actual reward (r) for the next path primitive is determined, as well as whether a collision will occur between the vehicle 10 and the parking constraints Cs as the vehicle 10 transitions from the current pose (P) to the next pose (Pnext).

At line 6, the total score (Score) of the path is incremented by the reward (r) of the next path primitive.

At lines 7 and 8 the next path primitive is added to the overall Path (Path) and the number of maneuvers (Nman) is incremented by 1.

At lines 9 and 10, the loop determines if a change has occurred in the direction of motion of the vehicle and increments a number of legs (Nleg) when a change in the direction of motion has occurred.

At lines 12 and 13, the loop identifies if a collision would occur and breaks when a collision would occur, setting the total path score to 0 indicating a failed path. Breaking the loop ends the iterations, setting the final path score to 0 indicating a failed path.

At lines 15-17, the loop sets the next path primitive selected to be the current path, and determines if the current path places the vehicle within a predefined proximity of a goal position (Pg) (referred to generally as "at a goal position (Pg)". If the path places the vehicle at a goal position (Pg), the loop is broken with the current score, and the pseudo code moves to line 24.

At lines 19-21, the loop determines if the maximum number of legs (L) has been reached, and when the maximum number of legs has been reached the loop is broken and the score is set to 0, indicating a failed path due to too many legs.

At line 22 the current pose (P) is set to the pose resulting from the just calculated maneuver (Pnext) and the loop iterates at line 3 again.

After completion or break of the loop, line 24 outputs the set of path primitives (Path) and the total score (Score) of the path, and the loop is completed.

The output of the pseudocode is the best possible path found. After selecting the best path, the process 300 generates path points 342 along the identified path primitive in a Generate Path Points step 340 (Step 4). The path points are provided to an automated vehicle system that operates the vehicle 10 along the path points 342, moving the vehicle to the goal pose in an Implement Maneuvers step 350 (Step 5).

Figure 4:
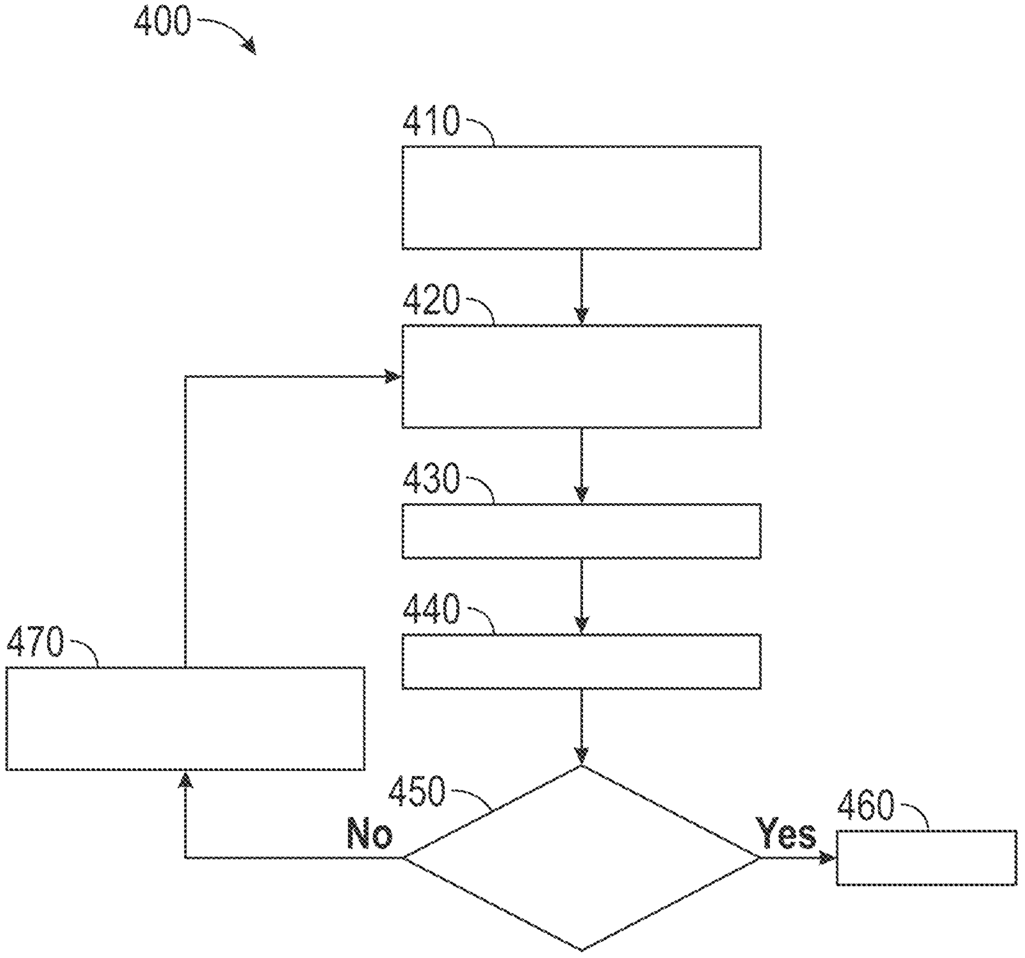
FIG. 4. is an exemplary process for generating a path score estimation function using neural networks and reinforced learning.

In order to accurately estimate the scores, the estimation neural network is determined using a reinforced learning process 400 illustrated at FIG. 4. Initially a neural network is configured to utilize path scoring data to generate path estimates in a Design Q Neural Network step 410. The Q neural network is trained using a data set including prestored simulation data and actual operation data in a Train Using Simulation/Real Data step 420. In one example, there are two possible architectures for the Q network. In the first architecture, the Q network obtains the system state S, the parking constraints (Cs) and the current pose of the vehicle (P). The number of Q network outputs matches the number of predefined actions where each output provides an estimated score for applying this action in the current state S. The second architecture has the same state inputs as the first architecture, as well as additional inputs to encode an examined action and only one output. The output provides an estimated score for applying the examined action in the current state S.

The output of the neural network is validated for plausibility in a validate step 430. When valid, the estimation performance of the neural network is tested with real world tests in a test performance step 440, and the requirements are checked in a check requirements check 450. When the requirements are met, the estimation algorithm is output and the process 400 is ended in a Done step 460. If the requirements are not satisfied, additional data is added to the training set in an Add Unsolved Cases to Training Set step 470, and the process 400 returns to the train using simulation/real data step 420.

In some examples, as additional data is generated through use of the system in real world vehicles, the additional data can be added in, and the neural network retrained in the same manner, resulting in a continuously improving estimation algorithm.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for planning a vehicle path comprising:

generating an initial perception data set using one or more vehicle sensors, wherein the initial perception data set includes data defining spatial positions of features extrinsic to a vehicle relative to the vehicle;

determining an operational area of a parking operation based on the generated initial perception data set;

identifying an initial pose of the vehicle, at least one goal pose of the vehicle, and a set of constraints using the initial perception data and the operational area;

iteratively generating sets of path segments using a reinforcement learning algorithm, wherein each completed set of path segments is configured to reposition the vehicle from the initial pose to one of the at least one goal poses, wherein iteratively generating the sets of path segments includes determining a total path score for each generated set of path segments, and wherein each completed set of path segments is defined by a sequentially ordered combination of simple actions and complex actions with each simple action being a single path primitive and each complex action comprising a stored algorithm configured to output a predefined set of path primitives ordered to achieve the specific vehicle maneuver, and wherein each path primitive is a driveable path segment defined by one of a straight line, an arc and a curve, wherein the arc is defined by an arc radius and an arc length;

wherein each completed set of path segments has a total number of path maneuvers less than a first threshold and a total path legs less than a second threshold;

selecting a set of path segments in the iteratively generated sets of path segments having a best total path score;

generating a set of path points using the path segments;

providing the set of path points to an automated parking controller operation within the vehicle; and wherein the automated parking controller operation causes the vehicle to move along the set of path points from the initial pose to a position within a predefined range of the one of the at least one goal poses.

2. The method of claim 1, further comprising replanning the parking operation as the vehicle moves along the set of path points in response to a new perception data set where the new perception data set varies from the initial perception data set.

3. The method of claim 1, wherein each simple action outputs one of an arc and a straight line, wherein the arc is defined by an arc radius and an arc length.

4. The method of claim 3, wherein each complex action defines a distinct specific vehicle maneuver.

5. The method of claim 1, wherein iteratively generating sets of path segments using a reinforcement learning algorithm comprises:

selecting a path primitive and estimating an estimated score reward corresponding to the path primitive using an estimation algorithm, responding to the estimated score reward exceeding a predetermined amount by simulating operation of the path primitive in a real world model and determining a simulated reward based on an output of the simulation, and placing the selected path primitive as a next path primitive in the set of path primitives and adding the simulated reward to a total reward of the set of path primitives.

6. The method of claim 5, wherein the estimation algorithm is an output of a neural network and wherein the estimated score reward, simulated score reward, selected path primitive and the set of constraints are added to an updated training data set of the neural network.

7. The method of claim 6, further comprising retraining the neural network and updating the estimation algorithm using the updated training data set and replacing the estimation algorithm with an updated estimation algorithm determined using the retrained neural network.

8. The method of claim 1, wherein the at least one goal pose comprises a set of goal poses included a finished parking position pose and at least one close pose, wherein the close pose is a pose from which the vehicle is able to be maneuvered to a finished parking position using at most three total combined simple actions and complex actions.

9. The method of claim 1, wherein iteratively generating sets of path segments using a reinforcement learning algorithm comprises comparing a total number of path maneuvers of a first set of path segments to the first threshold as the first set of path segments is being generated and ceasing generation of the set of path segment when the total number of maneuvers of the first set of path segments exceeds the first threshold.

10. The method of claim 1, wherein iteratively generating sets of path segments using a reinforcement learning algorithm comprises comparing a total number of path legs of a first set of path segments to the second threshold as the first set of path segments is being generated and ceasing generation of the set of path segment when the total number of path legs of the first set of path segments exceeds the first threshold.

11. A vehicle comprising:

a perception system including a ranging sensor, the perception system being in communication with a vehicle controller;

the vehicle controller having a memory and a processor, and including an automated parking module configured to perform a parking operation including:

generating an initial perception data set using one or more vehicle sensors, wherein the initial perception data set includes data defining spatial positions of features extrinsic to the vehicle relative to the vehicle;

determining an operational area of the parking operation based on the generated initial perception data set;

identifying an initial pose of the vehicle, at least one goal pose of the vehicle, and a set of constraints using the perception data and the operational area;

iteratively generating sets of path segments using a reinforcement learning algorithm, wherein each completed set of path segments is configured to reposition the vehicle from the initial pose to one of the at least one goal pose, and wherein iteratively generating the sets of path segments includes determining a total path score for each generated set of path segments, and wherein each completed set of path segments is defined by a sequentially ordered combination of simple actions and complex actions with each simple action being a single path primitive and each complex action comprising a stored algorithm configured to output a predefined set of path primitives ordered to achieve the specific vehicle maneuver, and wherein each path primitive is a driveable path segment defined by one of a straight line, an arc and a curve, wherein the arc is defined by an arc radius and an arc length;

wherein each completed set of path segments has a total number of path maneuvers less than a first threshold and a total path legs less than a second threshold;

selecting a set of path segments in the iteratively generated sets of path segments having a best total path score;

generating a set of path points using the path segments;

providing the set of path points to an automated parking controller operation within the vehicle; and wherein the automated parking controller operation causes the vehicle to move along the set of path points from the initial pose to a position within a predefined range of the one of the at least one goal poses.

12. The vehicle claim 11, further comprising replanning the parking operation as the vehicle moves along the set of path points in response to a new perception data set where the new perception data set varies from the initial perception data set.

13. The vehicle of claim 11, wherein each path primitive is one of an arc and a line, wherein the arc is defined by a radius and an arc length.

14. The vehicle of claim 13, wherein a subset of the sequentially ordered combination of path primitives is an output of a complex action, and the subset of sequentially ordered combination of path primitives is configured to achieve a known vehicle maneuver.

15. The vehicle of claim 11, wherein iteratively generating sets of path segments using a reinforcement learning algorithm comprises:

selecting a path primitive and estimating an estimated score reward corresponding to the path primitive using an estimation algorithm, responding to the estimated score reward exceeding a predetermined amount by simulating operation of the path primitive in a real world model and determining a simulated reward based on an output of the simulation, and placing the selected path primitive as a next path primitive in the set of path primitives and adding the simulated reward to a total reward of the set of path primitives.

16. The vehicle of claim 15, wherein the estimation algorithm is an output of a neural network and wherein the estimated score reward, simulated score reward, selected path primitive and the set of constraints are added to an updated training data set of the neural network.

17. The vehicle of claim 16, further comprising retraining the neural network and updating the estimation algorithm using the updated training data set and replacing the estimation algorithm with an updated estimation algorithm determined using the neural network.

18. The vehicle of claim 11, wherein the at least one goal pose comprises a set of goal poses included a finished parking position pose and at least one close pose, wherein the close pose is a pose from which the vehicle is able to be maneuvered to the finished parking position using at most three total combined simple actions and complex actions.

19. The vehicle of claim 11, wherein iteratively generating sets of path segments using a reinforcement learning algorithm comprises comparing a total number of path maneuvers of a first set of path segments to the first threshold as the first set of path segments is being generated and ceasing generation of the set of path segment when the total number of maneuvers of the first set of path segments exceeds the first threshold.

20. The vehicle of claim 11, wherein iteratively generating sets of path segments using a reinforcement learning algorithm comprises comparing a total number of path legs of a first set of path segments to the second threshold as the first set of path segments is being generated and ceasing generation of the set of path segment when the total number of path legs of the first set of path segments exceeds the first threshold.

* * * * *